Patented May 8, 1934

1,957,492

UNITED STATES PATENT OFFICE 1,957,492

PREPARATIONS FOR TREATING TEXTILE MATERIALS

George Holland Ellis, Spondon, near Derby, England, assignor to Celanese Corporation of America, a corporation of Delaware No Drawing. Application August 30, 1930, Serial No. 479,086. In Great Britain October 18, 1929

8 Claims. (Cl. 8—5)

This invention relates to the manufacture of preparations containing sulphoxylate compounds, the preparations being particularly suitable for use in the production of discharge effects on textile materials.

Formaldehyde and other sulphoxylates are very commonly employed in the production of discharge effects on textile materials, and for this purpose are usually applied in the form of pastes containing also thickening agents with or without catalytic materials, acids or other assistants. Where the content of the sulphoxylate compound exceeds a certain limit the discharge pastes frequently exhibit the defect that the sulphoxylate compound tends to separate out after short or long standing and the preparations become of little or no value for textile printing. This difficulty arises most frequently when it is desired to employ difficultly soluble sulphoxylate compounds, for example zinc formaldehyde sulphoxylate, in high concentrations.

I have now found that it is not essential for the sulphoxylate compound to be present entirely in the dissolved state and that highly satisfactory discharge effects can be obtained by means of sulphoxylate compounds in finely dispersed state. I have further found that discharge preparations containing finely dispersed sulphoxylate compounds are remarkably stable and that the sulphoxylate compounds do not tend to separate out even on long standing.

In accordance with the present invention, therefore, preparations particularly suitable for use in the production of discharge effects on textile materials comprise aldehyde or ketone sulphoxylate compounds in finely dispersed state. Thus, for example, a discharge preparation for use on cellulose ester materials may contain zinc formaldehyde sulphoxylate in a finely dispersed state in admixture with suitable thickening material. Preparations may be obtained which even when containing a high proportion of the zinc compound, remain homogeneous even after many days' storage, and yield very good discharge effects on cellulose ester materials. The new preparations may contain sulphoxylate compound in solution as well as sulphoxylate compound in dispersed form.

The new preparations may contain any desired aldehyde or ketone sulphoxylate compounds, for example the compounds with zinc or the alkaline earth metals or the product sold under the trade name "Decrolin." The sulphoxylate compounds may be substantially pure products or they may be the crude products as directly obtained, for instance by the interaction of an aldehyde or a ketone with a metallic hydrosulphite. The invention is, however, of particular advantage when it is desired to produce concentrated preparations of sulphoxylate compounds of low solubility, for example preparations of zinc formaldehyde sulphoxylate.

The sulphoxylate compounds may be brought into the desired finely divided or dispersed state by any suitable means, for example by grinding or milling with water or other liquid with or without the addition of protective colloids, e. g. starches, gums or glue, and/or dispersing agents such as Turkey red oil or the like. Such grinding or milling is conveniently carried out in a ball mill or other device which permits of carrying out the operation in the absence of air or in an inert atmosphere, for example an atmosphere of carbon dioxide. Preferably the grinding or milling with a liquid, particularly if the liquid is water, is carried out at a low temperature. The dispersions or any preparations made therefrom should subsequently be stored at a uniform, preferably low, temperature.

For application as discharging agents the new dispersions of sulphoxylate compounds may be mixed with thickening agents with or without other substances, for example those commonly employed in reducing discharge preparations, e. g. colloidal clay, zinc oxide, catalysts, colouring matters, swelling agents and the like. Very conveniently the preparation of the dispersion of the sulphoxylate compound may be combined with the preparation of the discharge paste. Thus, for example, a sulphoxylate compound, e. g. zinc formaldehyde sulphoxylate, may be subjected to milling with water with addition of the ingredients required in a paste suitable for application by printing. Such discharge preparations containing thickening materials with or without other substance, are included within the ambit of the invention.

The discharge preparations may be employed in the production of discharge effects upon textile materials of all kinds, the preparations containing zinc formaldehyde sulphoxylate being particularly suited for the production of discharge effects, whether white or coloured, upon materials made of or containing cellulose acetate or other cellulose esters or ethers.

The invention is illustrated but not limited by the following example:—

*Example*

The following mixture is prepared, the ingredients being added in the order of tabulation:—

|  | Grams |
|---|---|
| Gum arabic 1:1 | 200 |
| China clay | 50 |
| Water | 210 |
| Methylated spirits | 100 |
| Zinc formaldehyde sulphoxylate | 250 |
|  | 810 |

The mixture is milled in the cold in a closed ball mill for 24 hours. The paste is then removed and to it is added 190 grams of gum arabic 1:1 in the cold with thorough mixing. It is then ready for use as a printing paste. Basic or other selected colouring matters may be incorporated in any desired quantity conveniently by dissolving in the methylated spirits in the above recipe.

What I claim and desire to secure by Letters Patent is:—

1. A stable composition of matter comprising a substance selected from the group consisting of metallic aldehyde sulphoxylates and metallic ketone sulphoxylates, at least partly dispersed in the undissolved state in a liquid medium.

2. A stable composition of matter comprising a metallic formaldehyde sulphoxylate at least partly dispersed in the undissolved state in an aqueous medium, and a substance selected from the group consisting of protective colloids and dispersing agents.

3. A stable aqueous printing paste comprising a thickening agent and a metallic formaldehyde sulphoxylate at least partly dispersed in the undissolved state.

4. A stable composition of matter comprising zinc formaldehyde sulphoxylate at least partly dispersed in the undissolved state in a liquid medium.

5. A stable composition of matter comprising zinc formaldehyde sulphoxylate at least partly dispersed in the undissolved state in an aqueous medium containing a dispersing agent.

6. A stable aqueous printing paste comprising a thickening agent and zinc formaldehyde sulphoxylate at least partly dispersed in the undissolved state.

7. A stable composition of matter comprising a metallic formaldehyde sulphoxylate at least partially dispersed in the undissolved state in relatively high concentration in an aqueous medium and a substance selected from the group consisting of protective colloids and dispersing agents.

8. A stable aqueous printing paste comprising substantially 250 parts by weight of zinc formaldehyde sulphoxylate at least partially dispersed in the undissolved state in substantially 410 parts by weight of aqueous liquid.

GEORGE HOLLAND ELLIS.